United States Patent [19]
Orthey

[11] Patent Number: 5,263,254
[45] Date of Patent: Nov. 23, 1993

[54] GARDEN SHEARS

[75] Inventor: Gebhard Orthey, Nauroth, Fed. Rep. of Germany

[73] Assignee: Wolf-Gerate GmbH Vertriebsgesellschaft KG, Fed. Rep. of Germany

[21] Appl. No.: 937,507

[22] Filed: Aug. 28, 1992

[30] Foreign Application Priority Data

Aug. 30, 1991 [DE] Fed. Rep. of Germany ... 9110772[U]

[51] Int. Cl.5 .................. B26B 13/16; B26B 13/04; B26B 13/00
[52] U.S. Cl. .................................. 30/254; 30/252; 30/262
[58] Field of Search ............... 30/226, 239, 244, 254, 30/256, 261, 262, 266, 252

[56] References Cited

U.S. PATENT DOCUMENTS

| 2,310,959 | 2/1943 | James | 30/262 |
| 2,574,354 | 11/1951 | Smith | 30/262 |
| 4,341,016 | 7/1982 | Harrison et al. | 30/262 |
| 4,947,553 | 8/1990 | Bendickson et al. | 30/262 |
| 5,508,277 | 10/1991 | Kishimoto | 30/262 |

Primary Examiner—Frank T. Yost
Assistant Examiner—Paul M. Heyraha
Attorney, Agent, or Firm—Ostrolenk, Faber, Gerb & Soffen

[57] ABSTRACT

In garden shears the locking device which holds the shear grips in closed position against the force of an opening spring is developed as a slide grip which lies free both on the top and on the bottom of the one hand grip so that this slide can be actuated by the thumb of both the right hand and the left hand without it being necessary also to use the other hand. The slide grip has spring detents which cooperate with indentations in said one hand grip.

11 Claims, 3 Drawing Sheets

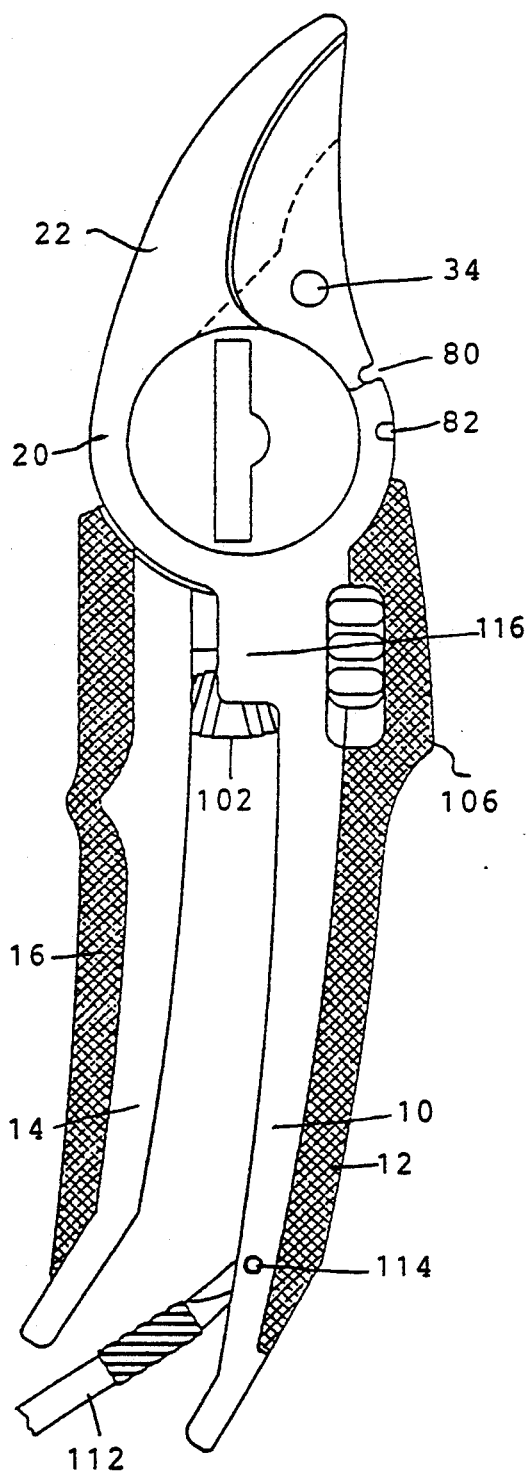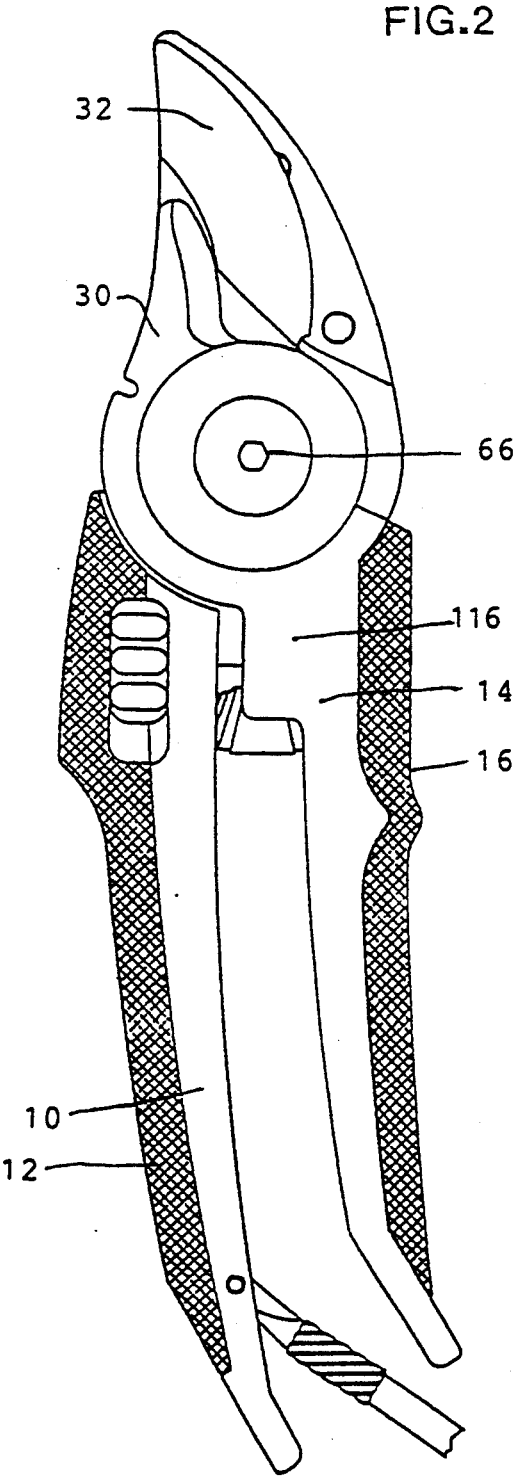

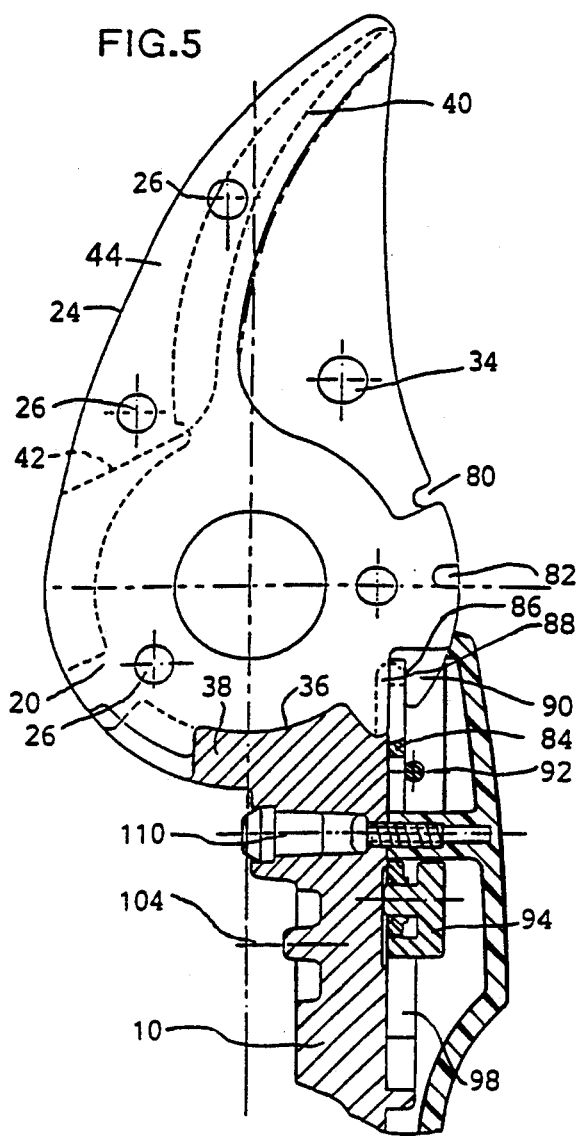
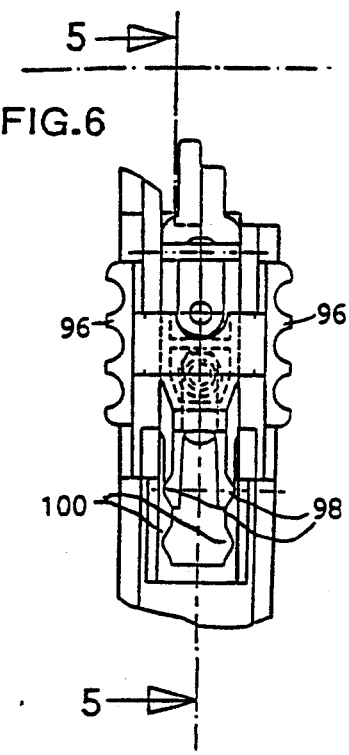
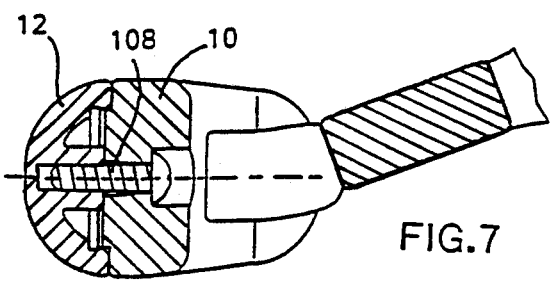
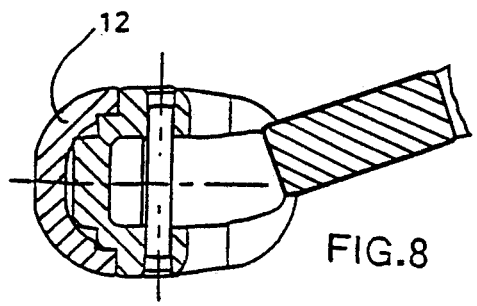

GARDEN SHEARS

The present invention refers to a device for locking the handles of garden shears in closed position against the action of an opening spring.

The primary object of the invention is to improve the ease of operation of garden shears with respect to its locking slide. This object is achieved in accordance with the instant invention by providing a locking device that is readily operated by both right-handed persons and left-handed persons since a grooved slide gripping surface protrudes on both sides of the upper handle and can be displaced by one's thumb without having to take the shears out of one's hand or changing the way one holds the grip.

Other features of the invention include the actual locking device for the shears, which device is formed by a steel slide which engages inward into the shear blades and thus blocks the shears against opening. In this connection, the stationary mating cutter in the upper grip serves as guide and as a force take-up means to oppose forceful opening of the shears. One side of the end of the slide is always in engagement, while the other side is pushed through a slot in the upper knife and serves as a block, and a pin on the slide handle grip engages into the slide. Both in open position and in closed position, the slide grip is engaged under spring action so as to avoid unintended closing or opening of the shears.

The slide grip is so arranged that it does not interfere with the shears upon use, an elevation on the outside of the upper grip or of an upper grip shell fastened thereto avoiding sliding of the shears with respect to one's hand so that the locking grip always lies free and can be conveniently found by the thumb of the right or left hand.

One embodiment of the invention will be described below with reference to the drawing, in which:

FIG. 1 is a front view of the garden shears forming the object of the invention;

FIG. 2 is a rear view of FIG. 1;

FIG. 5 is a cross section along the line 5—5 of FIG. 6;

FIG. 6 is a view of the locking slide;

FIG. 7 is a sectional view of the upper grip showing the attachment of the grip shell;

FIG. 8 is a sectional view through the upper grip showing the attachment of the hand loop.

Figure 3:
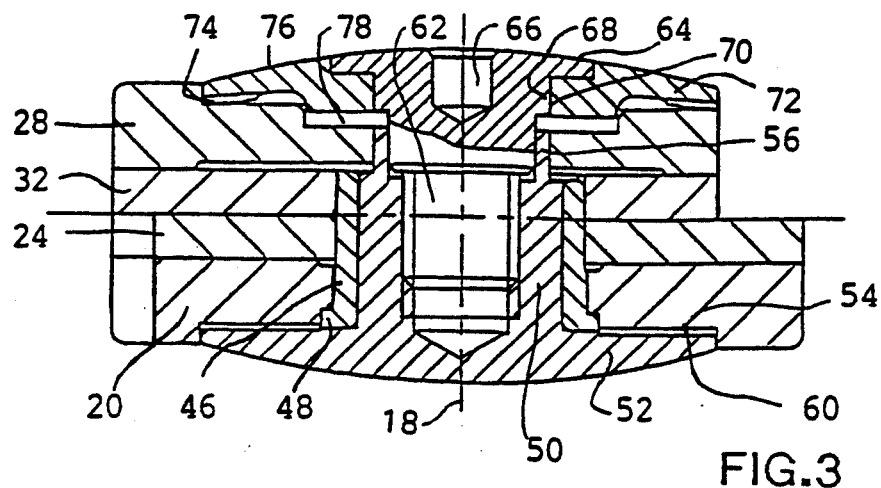
FIG. 3 is a cross-sectional view through the shears on a larger scale, seen at the height of the pivot pin.
Figure 4:
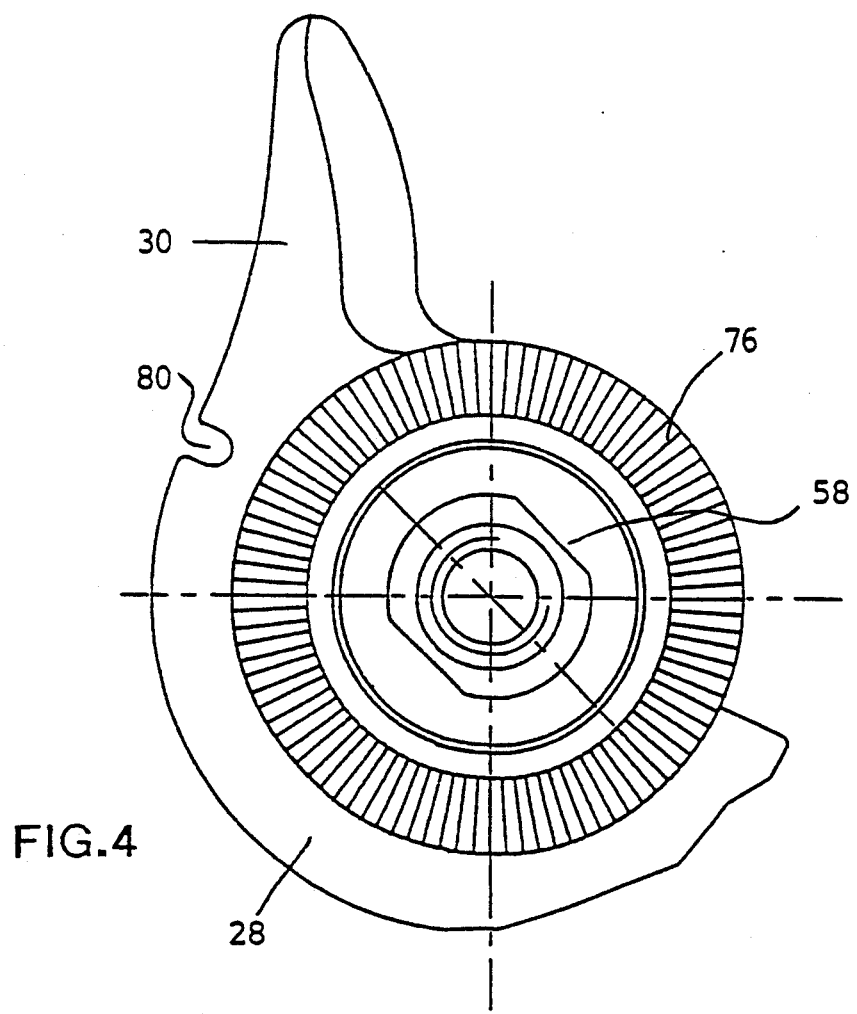
FIG. 4 is a partial view of the lower grip

The shears have an upper grip 10 with grip shell 12 and a lower grip 14 with grip shell 16. The grips 10 and 14 consist of aluminum diecastings and the grip shells consist of plastic. The two grips are connected to each other by a shear joint with pivot pin 18. In the region of the joint both grips are developed in the form of annular disks and extend beyond the joint into the region of the cutting knives. The ring-shaped joint section 20 of the upper grip 10 is continued in a crescent-shaped section 22. In the region of its sections 20 and 22, the upper grip 10 bears the mating knife 24 the external peripheral shape of which is adapted to the sections 20 and 22 of the upper grip 10. This mating knife 24 is connected to the upper grip by rivets 26. Since this mating knife is subjected to less wear, it can be firmly fastened by these rivets to the upper grip 10. If necessary, however, replacement is possible by loosening the rivets. The rivets 26 are produced by diecasting together with the upper grip 10 and therefore are not visible from in front (FIG. 1).

The lower grip 14 also has a ring-shaped joint section 28 as well as a finger-like extension 30. The knife blade 32 which cooperates with the mating knife 24 and lies free in the region of the cutting edge is supported by these sections 28 and 30, i.e. the finger-like extension 30 extends, as can be noted in particular from FIG. 2, only over the rear lower section of the knife blade 32 so that the cutting region of the blade lies free and unimpeded cutting is possible. The finger-like extension 30 is flattened towards the blade, whereby a favorable guidance for the material being cut is obtained. On its inner side, the extension 30 has a pin 34 developed thereon, which pin extends into a hole in the knife blade 32 and thereby produces a form-locked connection in circumferential direction. Another form-locked connection, not visible in the drawing, is present in the disk-shaped section on the opposite side. Here, the knife blade 24 is provided in its ring-shaped region with a sector cut-out, into which a corresponding projection of the ring-shaped joint section 20 protrudes. This form-locked connection is developed in the same way as shown in FIG. 5 for the mating knife 24. The mating knife has a sector-shaped cut-out 36 into which a correspondingly shaped projection of the joint section 20 extends.

The knife blade 32 lies flatly against the mating knife 24 in the ring-shaped section and in the edge section lying in the same plane, which edge section is formed by the section 44 which is set back along the edge 42.

The joint has a steel bushing 46 which is held fast in a press seat in a hole in the ring-shaped section 20 of the upper grip 10. By an outwardly directed annular flange 48, the bushing rests against a corresponding annular step of the joint section 20 and extends through the hole in the mating knife 24 and through the joint hole in the knife blade 32.

A screw bushing 50 is inserted from the upper grip through the steel bushing 46 the screw bushing 50 having a flat outwardly convex head shallow 52 which engages on an annular recess 54 in the ring-shaped joint section 20 of the upper grip 10 so that on the top side (FIG. 1) the joint section is flat and catching on branches and the like is avoided.

The screw bushing 50, as can be noted from FIG. 3, engages in form-locked manner by its flattened end section 56 into a correspondingly shaped hole 58 in the ring-shaped joint section 28 of the lower grip 14, so that the head 52 of the screw bushing 50 is turnable relative to the ring-shaped joint section 20 and the mating knife 24 but connected, fixed in rotation, with the lower grip. In order to assure free turning, an annular slot 60 is provided between the depression 54 and the inner side of the head 52. A pivot screw 62 is screwed into the internal thread of the screw bushing 50. The pivot screw 62 has a flat outwardly convex shallow head 64 which is provided with a hexagon socket 66. Under its head, which is extended outward in flange-like manner, the pivot screw has a square 68 by which it enters, in form-locked manner, into a corresponding square hole 70 in a detent disk 72 which comes to lie in an annular recess 74 in the joint section 28 and has an outwardly slightly convex shape which passes into the surface of the section 28 and the surface of the head 64. Within the depression, the ring-shaped joint section 28 has detent means 76 in the form of radially extending teeth which cooperate with corresponding detent means 78 of the detent disk 72, which also consist of radially extending teeth.

By this flat shear joint which is integrated in the design, catching on branches or the like is prevented. The radial load is taken up by the steel bushing 46 and the axial load by the screw bushing 50, the pivot screw 62, and the detent disk 2. In this way, the shear forces and axial forces are taken up in different structural parts. The joint screw 62 assures a simple possibility for the resetting of the shear blades, the detent means 76 and 78 assuring the retention of the position set. After loosening the pivot screw and removing the lower grip the knife blade 32 can be simply lifted off and replaced or reground.

For the cutting of wire and the like, the knife blade 32 and, aligned with it, the extension 30 of the joint part 28 has an incision 80 which can be brought into coincidence with a corresponding incision in the upper knife 24. The wire cutter 80, 82 which is thus formed lies accordingly outside the cutting region of the knife blade 32, so that careless damage to the knife by the cutting of wire by means of the blade is avoided.

The holding closed for the locking of the shears in the closed position is effected by a slide 84 which is mounted for longitudinal displacement in the upper grip 10. In the locking position shown in FIG. 5, this slide 84 engages into a slot 86 in the knife blade 32 and thus locks the lower grip with respect to the upper grip. At the same time, the slide, which consists of steel acts on the rear edge 88 of a recess 90 in the mating knife 24 so that the two knifes are locked with respect to each other. The slide 84 travels on a flat surface of the upper grip 10 and is secured by a pin 92 which comes to lie on the opposite side of the slide 84. In this way, one side of the slide is always in engagement, while the other side is inserted into the slot of the upper knife 24 for the interlocking. A slide grip 94 of plastic, which protrudes with grip 10 flutings 96 (FIG. 6) on both sides of the upper grip 10 engages into the slide 84, so that this slide grip 94 can be conveniently operated by both left-handed and right-handed persons. On the rear end of the slide, which is covered towards the outside by the grip shell 12, there are two spring detents 98 which engage in indentations 100 in the upper grip and prevent unintended closing or opening of the shears. The slide, mounted in this manner, does not come into contact with one's hand upon cutting, so that injuries are avoided. An opening spring 102 in traditional fashion produces a spreading apart of the grips 10 and 14; its ends are placed on extensions 104 of the handles 10 and 14, respectively.

The plastic shells 12 and 16 are provided on the diecast handles for skin-friendly convenience, for the covering of the locking slide and for a saving in weight. On the upper grip shell an elevation 106 is provided in the front region to prevent the forward slipping of the hand into the region of the locking slide. The upper grip shell 12 and the lower grip shell 14 are secured on all sides against shifting by a groove-rabbet connection. These shells are secured against being pulled off against the direction of force upon the cutting by, in each case, two screws 108. The shape of the handles is such that the opening spring 102 and a stop bumper 110 are covered, in the closed condition, on both sides by ribs 116. These ribs 116 serve also to stabilize the diecast parts. A considerable distance from the corresponding upper and lower handles is provided, which prevents the surfaces of the hand being clamped. For the same reasons, large radii are also provided at this place. A hand loop 112 is so placed on the rear end of the upper grip 10 that it gets along without disturbing protruding parts and does not get in the way upon working. The loop 112 is secured by a pin 114 which is inserted into a hole in the upper grip.

I claim:

1. Garden shears including an upper grip (10) provided with a mating knife (24), a lower grip provided with a knife blade (32), a shears joint pivotally connecting said grips for movement between open and closed positions, an opening spring (102) that biases said grips to said open position, and a locking device for holding said grips in said closed position against the force of said opening spring (102), said upper grip including upper and lower sides, and an edge, said locking device including a slide (84) movable along said edge and longitudinally displaceable in a guide in the upper grip (10), said slide being movable to a blocking position entered into a slot (86) defined by means on the lower grip (14), said locking device also including a slide grip (94) for moving said slide (84), said slide grip lying free on the upper and lower sides of the upper grip (10).

2. Garden shears according to claim 1, in which the mating knife (24) is provided with a recess (90) having a rear edge (88), and the slide (84) having a front end that acts on the rear edge (88) of the recess (90) in the mating knife (24).

3. Garden shears according to claim 2, also including a pin (92) that secures the slide (84) to the upper grip (10).

4. Garden shears according to claim 3, in which the slide grip (94) is provided with spring detents (98) that cooperate with indentations (100) in the upper grip (10).

5. Garden shears according to claim 4, in which the slide grip (94) is covered on the outside by an upper grip shell (12) which is operatively positioned on the upper grip (10).

6. Garden shears according to claim 5, in which the upper grip shell (12), below the slide grip (94), is provided with an elevation (106) that serves as a hand rest.

7. Garden shears according to claim 6, in which the slide grip (94) protrudes on both sides of the upper grip and is provided with grip flutings (96).

8. Garden shears according to claim 1, in which the slide grip (94) is provided with spring detents (98) that cooperate with indentations (100) in the upper grip (10).

9. Garden shears according to claim 8, in which the slide grip (94) is covered on the outside by an upper grip shell (12) which is operatively positioned on the upper grip (10).

10. Garden shears according to claim 9, in which the upper grip shell (12), below the slide grip (94), is provided with an elevation (106) that serves as a hand rest.

11. Garden shears according to claim 10, in which the slide grip (94) protrudes on both sides of the upper grip and is provided with grip flutings (96).

* * * * *